United States Patent
Mossberg et al.

(10) Patent No.: US 7,056,371 B2
(45) Date of Patent: Jun. 6, 2006

(54) LIQUID CLEANING DEVICE

(75) Inventors: Lars Mossberg, Linkoping (SE); Aapo Saask, Stockholm (SE)

(73) Assignee: HVR Water Purification AB, Stockholm (SE)

( * ) Notice: Subject to any disclaimer, the term of this patent is extended or adjusted under 35 U.S.C. 154(b) by 160 days.

(21) Appl. No.: 10/296,104

(22) PCT Filed: May 22, 2001

(86) PCT No.: PCT/SE01/01147

§ 371 (c)(1),
(2), (4) Date: Aug. 13, 2003

(87) PCT Pub. No.: WO01/89999

PCT Pub. Date: Nov. 29, 2001

(65) Prior Publication Data

US 2004/0222138 A1 Nov. 11, 2004

(30) Foreign Application Priority Data

May 22, 2000 (SE) .................................... 0001950

(51) Int. Cl.
*C02F 1/18* (2006.01)
*A23L 3/005* (2006.01)

(52) U.S. Cl. .......................... 96/205; 96/218; 210/180; 210/498; 261/106; 261/113; 99/292; 99/315; 95/252

(58) Field of Classification Search .................. 96/218, 96/205; 95/252; 210/180, 498, 473, 477, 210/335, 184, 416.3; 261/113, 106; 99/303, 99/315, 292

See application file for complete search history.

(56) References Cited

U.S. PATENT DOCUMENTS 1,306,415 A * 6/1919 Dunlap ........................ 99/292
2,598,988 A * 6/1952 Glasgow ...................... 95/252
4,126,540 A * 11/1978 Grosboll et al. ............ 208/146

FOREIGN PATENT DOCUMENTS

DE 3239409 A1 * 4/1984
SE 510287 C2 * 5/1999

* cited by examiner

OTHER PUBLICATIONS

International Preliminary Examination Report PCT/SE01/01147.*

*Primary Examiner*—Duane Smith
*Assistant Examiner*—Douglas J. Theisen
(74) *Attorney, Agent, or Firm*—Thomas. Kayden, Horstemeyer & Risley, LLP

(57) ABSTRACT

A liquid cleaning device comprises a vessel (1), a bottom plate (3), a heating device and a tubular riser (12) arranged in the vessel for heated liquid ascending through the riser, the heated liquid from the upper, open end of the riser running back through force of gravity down and outside of the riser to be reheated and ascend agains through the riser, and so on. The vessel—61) is cylindrical and substantially its entire base (17) can be heated by means of the heating device (171). A plurality of discs (51–54) of equal size are arranged in the upper part of the vessel (1), said discs having a central aperture (510) for the riser (12) and a plurality of small holes (511) distributed uniformly across the entire surface of the discs and provided with drip edges (5110). A distributor (14) is arranged at the upper, open end of the riser (12) to distribute the hot liquid coming out of the ruser uniformly over the uppermost disc (51).

13 Claims, 2 Drawing Sheets

LIQUID CLEANING DEVICE

TECHNICAL FIELD

The present invention relates to a liquid cleaning device intended for purifying liquid from pollutants and comprising a vessel for the liquid having a lower part provided with heating means, an upper part for the liquid and a tubular riser arranged centrally in the vessel for heated liquid ascending through the riser, the heated liquid from the upper, open end of the riser running back through force of gravity down through the upper part, outside the riser, to be reheated and vaporised and then ascend again through the riser, and so on.

BACKGROUND ART

One problem that the present invention aims to solve is the following. In most large towns tap water is produced in large plants and transported to the consumers through a system of pipes. To protect the water from infection risks during transportation a certain amount of chlorine is normally added before the clean water leaves the plant.

A certain amount of this chlorine is consumed on the way and a certain amount remains in the water when it reaches the consumers. The reason for the addition of chlorine is for it to break down potentially dangerous organic pollutants in the pipes. When this occurs chlorinated hydrocarbons such as chloroform and bromoform are produced. These substances are therefore also present to a certain extent in the water that reaches the consumers.

Even though the quantities of chlorine and chlorinated hydrocarbons are low in the water, it is known that both types of the compounds are mutagenous even in small doses and It is therefore an advantage if they can be avoided as far as possible.

A market has long existed for various types of filters suitable for purifying water from municipal pipes or private wells. However, traditional filters in the form of fine-meshed nets do not stop volatile substances like chorine and chlorinated hydrocarbons. Nor do filters containing ion-exchanging compounds (e.g. softeners) achieve this.

For this reason filters containing active carbon are now frequently used. The drawback with active carbon is that it is difficult to know when the filter is full and in many investigations it has been ascertained that the active carbon can quickly lose its effect if the load unexpectedly increases, thereby being transformed to a refuge, nutrient supply and germination spot for bacteria and other pyrogens.

The carbon filter is thus often combined with other methods to a more complicated apparatus including pre-filters to stop coarse particles and organic material, lamps with ultraviolet light to kill bacteria and ion exchangers to attract ions. Such equipment is relatively expensive and only functions satisfactorily if the coarse filters, ultraviolet lamps, ion-exchanging compound and active carbon are carefully changed. An alternative to these multi-step filters has also been developed that is based on distillation and reverse osmosis. However, none one of these per se advanced methods removes chlorine and chlorinated hydrocarbons entirely efficiently, and must be supplemented by a final filter of active carbon. Although the load on this final filter is far less than on carbon filters in the multi-step filters mentioned earlier, it must still be changed regularly and the problem of overloading remains.

A simpler method of killing bacteria and also removing chlorine and chlorinated hydrocarbons, as well as other volatile substances from the water is to boil the water in a boiler or an open vessel. There are primarily three drawbacks with this simple method in comparison with those mentioned earlier. A considerable amount of water must be boiled away in order to be certain that the volatile pollutants have been removed, which first of all is a waste of water and secondly results in a concentration of any non-volatile pollutants that may be in the water. The third drawback is that the user does not know when a satisfactory result has been reached.

A considerable number of industrial methods have been developed to separate liquid from gas, gas from liquid and one gas from another gas. The most usual principle is the cyclone principle whereby a steam/gas/water mixture is centrifuged and the liquid is thus forced out of the mixture. A very similar principle is for the mixture to be led through a pipe with many bends, the liquid being stopped by devices of various shapes in the bends.

Surface-enlarging devices are also used so that the water/gas/steam mixture is sprayed or sprinkled onto large plates or allowed to run down large plates or some other type of arrangement having a large surface, such as steel wool or plastic pellets.

It is also possible to force a gas, such as air or nitrogen, through the mixture. This gas then drives off other gases in the mixture or draws them with it. Often a combination of these techniques is used.

A previously known liquid cleaner of this type is described in Swedish Patent No. 510 287, according to which water is heated in a small depression in the bottom of a jug. The water is forced upwardly through a riser open at the top and then falls down of its own accord when it is stopped by the lid of the jug. The jug also contains a plurality of alternately convex and concave discs of different diameter spaced relatively far apart (1.5–2.5 cm) along the riser.

This liquid cleaner functions well per se but it has been considered desirable to obtain an improved version through technical development, which will give more liquid per time unit at lower cost.

DESCRIPTION OF THE INVENTION

In a liquid cleaning device of the type mentioned above and in accordance with the invention, the vessel is cylindrical and substantially its entire base can be directly heated by means of the heating device. Furthermore, a plurality of plane-parallel discs of equal size are arranged in the upper part of the vessel, said discs having a central aperture for the riser and a plurality of small holes distributed uniformly across the entire surface of the discs. These and other features of a liquid cleaning device in accordance with the invention are revealed in the appended claims.

DESCRIPTION OF THE DRAWINGS

The invention will now be described in more detail with reference to the accompanying drawings in which.

PREFERRED EMBODIMENT

Figure 1:
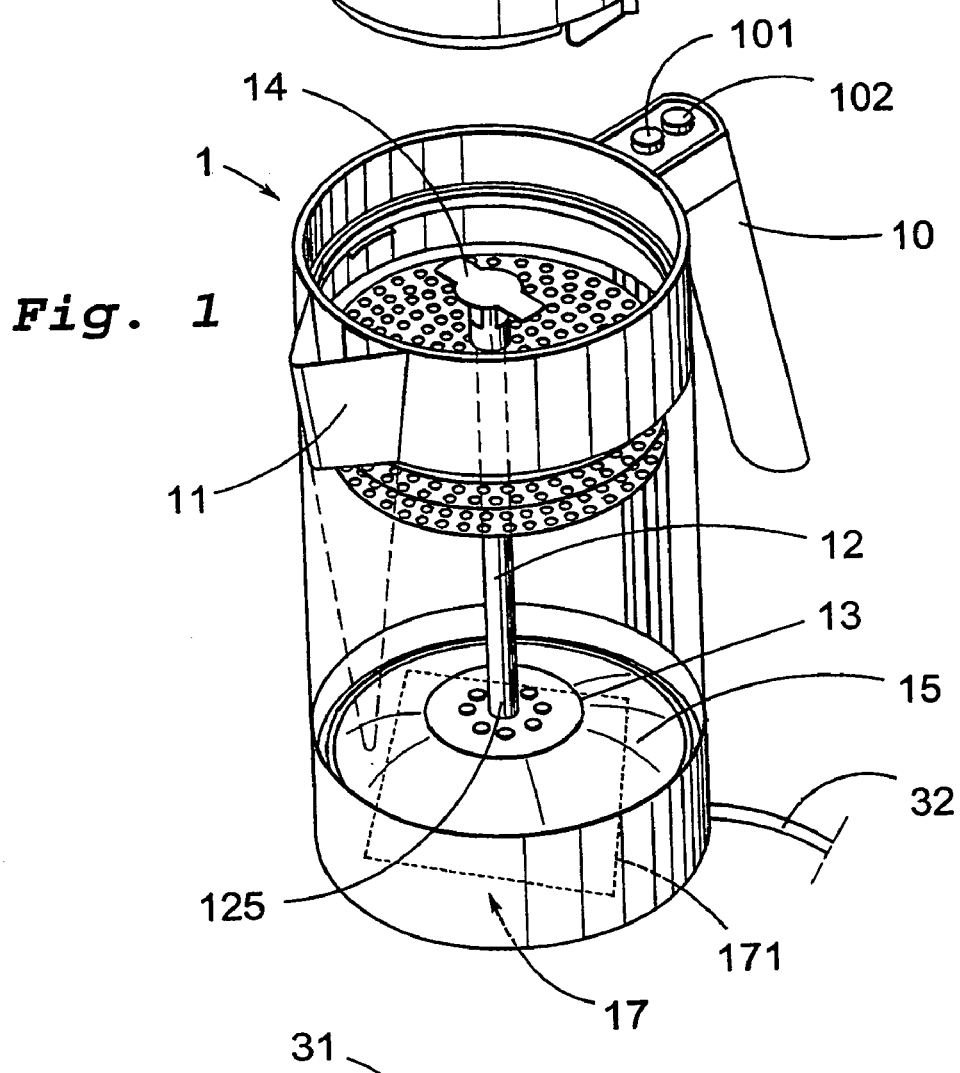
FIG. 1 shows schematically a liquid jug in accordance with the invention.
Figure 3:
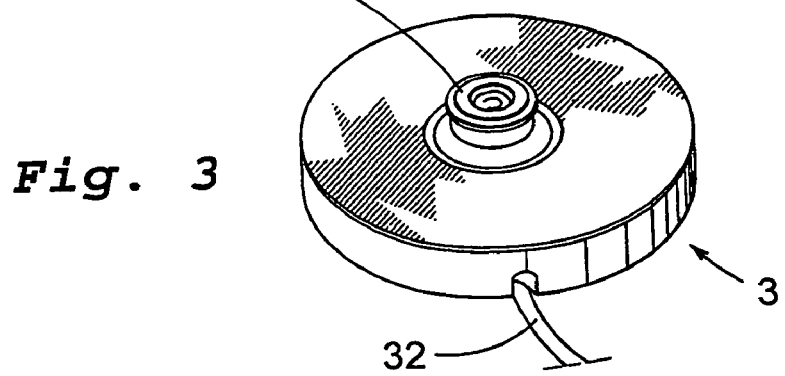
FIG. 3 shows schematically a bottom plate pertaining to the liquid jug.

The liquid jug 1 shown in FIG. 1 looks like an ordinary cylindrical jug with a handle 10 and spout 11. A start button 101 and a stop button 102 are provided on the handle. At the bottom of the jug is a dome 15 of insulating material, arranged to constrain a specific quantity of liquid which is heated from below by the bottom 17 of the jug being heated by a flat, electrical heating device 171 on the lower side (hidden) of the bottom 17, supplied with electricity from a bottom plate 3 via an electric contact 31 protruding upwards. The dome 15 has a height of about 20 mm and is conical or arched in shape so that air does not collect beneath it. This shape also facilitates the water flow occurring when the liquid is heated.

Figure 2:
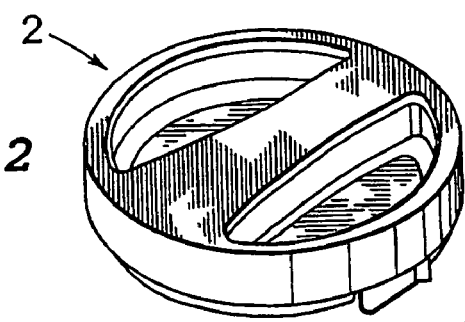
FIG. 2 shows schematically a lid pertaining to the liquid jug.

A lid 2 is provided for the jug 1, shown in FIG. 2, with bayonet coupling to fit the opening of the jug 1.

Figure 5:
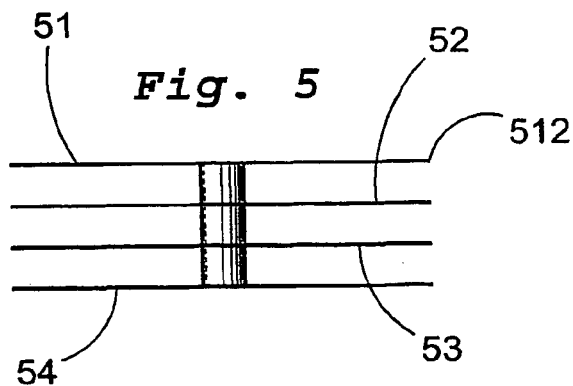
FIG. 5 shows schematically the set of discs illustrated in FIG. 4 from the side.
Figure 8:
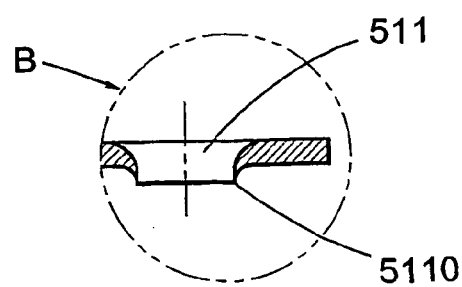
FIG. 8 shows a section from the side of one of a plurality of holes in the disc illustrated in FIG. 6.

FIG. 1 shows a riser in the jug 1, comprising an inner, central, tubular member designed for liquid heated in the dome 15 to ascend through the member 12. The dome 15 is located at the lower end 125 of the riser 12 and fits into the bottom of the jug, at the same time acting as attachment for the riser. A number of discs 51, 52, 53, 54, see FIG. 5, are arranged at the upper part of the riser 12, and are provided with central apertures for the riser. The discs are the same diameter as the lid and are placed at equal distances from each other, approximately 0.9 cm. The discs may be perforated in various ways. In the embodiment illustrated they are perforated over the entire surface with identical holes between 2 and 4 millimetre in diameter. The holes are provided with a drip edge 5110 on the lower side, see FIG. 8, in order to facilitate drop formation so that the liquid (water) is distributed uniformly on the disc below. The discs can be removed from the riser to permit cleaning.

Figure 4:
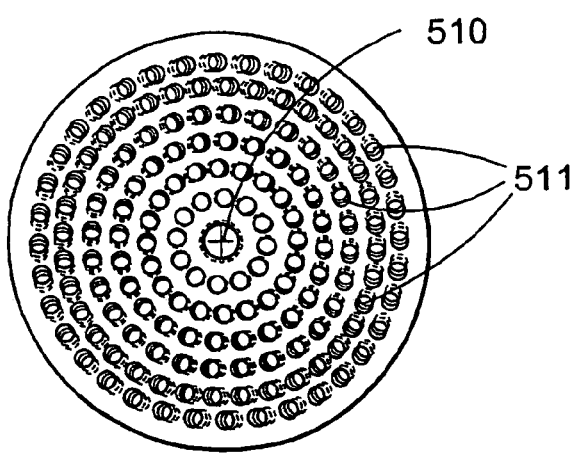
FIG. 4 shows schematically a set of discs from above.
Figure 6:
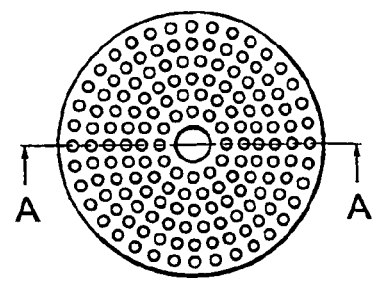
FIG. 6 shows schematically one disc from the set, from above.
Figure 7:
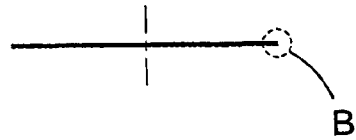
FIG. 7 shows a section A—A through the disc illustrated in FIG. 6, seen from the side.

FIG. 4 shows the set of discs 51–54 from above, the uppermost disc 51 being provided with a central aperture 510 and perforations (small holes) 511 over its entire surface. FIG. 6 shows only the disc 51 with its holes, and FIG. 7 shows a section A—A from the side. One of the holes is designated B and this hole is enlarged in section in FIG. 8 so that the drip edge 5110 is clearly visible.

The riser 12 with the discs 51–54 in place is inserted in the jug 1 with the lower part of the dome 15 in contact with the bottom 17.

When it is to be used the jug 1 is filled with liquid (water) and then placed on the bottom plate 3 and electric contact 31 whereupon it is automatically connected to the electricity supply via a cord 32. When the liquid is heated, gas bubbles form at the bottom of the jug and are gathered towards the riser 12 by the dome 15 so that heated water is forced up into the riser 12 by the steam. This water is sprayed up through the riser 12 towards a special distributor (water spreader) 14 which distributes the water evenly over the first disc 51. The water then runs through the perforations 511 and over the outer edge 512 to the next disc 52 where the procedure is repeated. The water continues to run down through a number (4) of discs and then up again through the riser 12 until the liquid has by experience been purified as well as possible from pollutants.

Since the bottom of the jug 1 is heated up, the water below the insulating dome will boil. Steam bubbles formed will then press previously heated water up through the riser 12. The dome 15 is gradually filled through a valve 13 at the lower end of the riser, allowing water to run down into the dome but preventing steam from coming out any other way than through the riser 12. This is because, when steam bubbles are formed, they press on the valve and when the steam bubbles ascend through the riser the valve 13 is released and the water can run down into the dome. This technology is known per se, see Swedish patent No. 510 287, page 4, sixth paragraph, for instance.

Polluting compounds liberated during the process will disappear through the spout 11 of the jug and through gaps between the jug 1 and lid 2.

Test Results

The new liquid cleaning device has undergone certain tests to ascertain the extent to which water samples have been liberated from pollutants. The following table shows from the left:

Column I: polluting substance

Column II: boiling point of the substance elimination in % of polluting substance after 3.5 minutes heating with new apparatus;

elimination in % of polluting substance after 6 minutes heating with new apparatus elimination in % of polluting substance after 12 minutes heating with apparatus in accordance with Swedish patent No. 510287.

| I substance | II boiling point | III elimination in %, 3.5 min. new app. | IV elimination in %, 6 min. new app. | V elimination in %, 12 min. with app. as in Sw. patent 510 287 |
|---|---|---|---|---|
| 1. 3-hexanone | 125 | 39.5 | 91.3 | 77 |
| 2. butyl acetate | 127 | 39.7 | 90.4 | 86 |
| 3. chlorobenzene | 132 | 69.2 | 91.3 | 94 |
| 4. 1-chlorohexane | 135 | 91.7 | 98.9 | 94 |
| 5. 1-hexanol | 158 | 38.3 | 80.3 | 35 |
| 6. anisole | 155 | 55.5 | 87.9 | 71 |
| 7. pentyl acetate | 149 | 68.8 | 93.6 | 82 |
| 8. propylbenzene | 159 | 93.7 | 97.2 | 90 |
| 9. decane | 174 | 98.3 | 99.5 | 90 |
| 10. dichlorobenzene | 174 | 90.4 | 96.3 | 84 |

-continued

| I substance | II boiling point | III elimination in %, 3.5 min. new app. | IV elimination in %, 6 min. new app. | V elimination in %, 12 min. with app. as in Sw. patent 510 287 |
|---|---|---|---|---|
| 11. 1-chloroctane | 182 | 98.2 | 99.5 | 91 |
| 12. acetophenone | 203 | 54.7 | 73.7 | — |
| 13. 1-octanol | 194 | 64.7 | 89.1 | 53 |
| 14. benzyl acetate | 215 | 54.0 | 79.2 | 71 |
| 15. naphthalene | 218 | 88.8 | 94.0 | 54 |
| 16. 2.6-chloranisole | 235 | 86.5 | 94.4 | 72 |
| 17. 3-phenyl-1-propanol | 237 | — | — | — |
| 18. 1-chlordecane | 223 | 98.7 | 99.7 | 91 |
| 19. 1-decanol | 229 | 83.9 | 93.6 | 68 |
| 20. tetrachlorobenzene | 246 | 96.5 | 98.1 | 75 |
| 21. methyldecanoate | 224 | 96.6 | 98.8 | 89 |
| 22. trichloranisole | 228 | 93.2 | 96.4 | 71 |
| 23. ethylcinnamate | 272 | 62.5 | 85.1 | 27 |
| 24. diphenylether | 258 | 91.5 | 95.4 | 69 |
| 25. methoxynaphthalene | 174 | 83.3 | 85.7 | 20 |
| 26. 1-chlorododecane | 260 | — | — | 90 |
| 27. pentachlorobenzene | 277 | 93.6 | 96.0 | 61 |
| 28. methyldodecanoate | 262 | 97.9 | 99.6 | 90 |
| 29. 1-hexadecane | 284 | 81.4 | 92.3 | 76 |
| 30. benzophenone | 306 | 46.1 | 56.5 | 21 |
| 31. 1-chlorotetradecane | 292 | 86.5 | 96.5 | 77 |
| 32. anthracene | 340 | 92.9 | 94.0 | 82 |
| 33. octadecane | 316 | 68.9 | 75.6 | — |
| 34. 1-chlorohexadecane | 322 | 82.2 | 91.2 | 62 |
| 35. 1-chloroctadecane | 348 | 76.7 | 84.7 | — |

The test results after 6 minutes of heating with the new liquid cleaning device are as good or better than the results after 12 minutes of heating with a device in accordance with known technology as described in Swedish Patent No. 510287, for instance, and the water consumption is as slight.

The invention is naturally not limited to the examples stated above. It can be modified in many ways within the scope of the following claims.

The liquid cleaning device may be designed for a few decilitres of liquid up to many litres, and for heating by means of electric current in the bottom plate 3 or by a flame from gas, liquefied petroleum gas, biomass, coal or other fuel in solid or liquid form, or by solar energy. The cleaning device may be separate or built into a stove, oven, heater or other heating means. It may also be connected to a water pipe to be continuously filled with water.

According to one embodiment the purified liquid can be transferred to a special container where it can be used as it is or kept hot by an electric loop, for instance, cooled by a compressor, for instance, or used for preparing drinks.

According to another embodiment the heated liquid is pumped up through the riser (pipe) 12 by means of an electric pump, for instance.

Liquid cleaning devices with greatly increased capacity can be installed or built into district heating plants for houses or apartment blocks. These cleaning devices are then suitably switched on automatically as the need for pure water arises. This type of large cleaning device may be used for restaurants, hotels, in the food industry, etc.

In all vessels a considerable problem entailed in heating water is the precipitation of calcium and ferric oxide. It may therefore be suitable to insert a calcium filter or other ion exchanger in a special container above the water surface but below the aperture of the central riser 12. Since this is the part that will be most subjected to calcium deposits it is suitable for it to be made of a flexible material allowing easy cleaning from hard deposits. The part may also be provided with sharp edges so that calcium can easily be broken off. However, decalcification can also easily be performed using weak acids like citric or acetic acid, or through magnetic influence.

The invention claimed is:

1. A liquid cleaning device intended for purifying liquid from pollutants and comprising a vessel (1) for the liquid, a bottom plate (3), a heating device and a tubular riser (12) arranged centrally in the vessel (1) for heated liquid ascending through the riser, the heated liquid from the upper, open end of the riser (12) running back through force of gravity down and outside of the riser to be reheated and ascend again through the riser, and so on, characterized in that the vessel (1) is cylindrical and substantially its entire base (17) is configured to be heated by means of the heating device (171); in that a plurality of discs (51–54) of equal size are arranged in the upper part of the vessel, said discs having a central aperture (510) for the riser (12) and a plurality of small holes (511) distributed uniformly across the entire surface of the discs and provided with drip edges (5110); and in that a distributor (14) is arranged at the upper, open end of the riser (12) to distribute the hot liquid coming out of the riser uniformly over the uppermost disc (51).

2. A liquid cleaning device as claimed in claim 1, characterized in that the diameter of the discs (51–54) is approximately equal to the inner diameter of the cylindrical vessel (1); in that each of the discs are arranged in a plane, each plane being substantially parallel to the plane of the other discs; in that the distance between the discs is about 9 mm; and in that the small holes in the discs (51–54) have a diameter of about 2–4 mm.

3. A liquid cleaning device for purifying a liquid from pollutants, the device comprising:

a cylindrical vessel for holding the liquid, the vessel having an upper portion and a lower portion, the lower portion arranged to contain a portion of the liquid;

a heating device located in the lower portion of the cylindrical vessel and configured to heat the portion of the liquid in the lower portion of the vessel;

a plurality of discs of substantially equal diameter arranged in the upper portion of the cylindrical vessel and having a diameter approximately equal to the inner diameter of the upper portion of the cylindrical vessel, the plurality of discs having a plurality of holes distributed uniformly across the surface of the discs, the holes having drip edges;

a tubular riser arranged centrally in the vessel, the tubular riser extending from the lower portion of the cylindrical vessel and through the plurality of discs, the riser configured for liquid heated by the heating device to ascend through the riser from the lower portion to an upper, open end of the tubular riser; and a distributor arranged at the upper, open end of the riser to distribute the heated liquid uniformly over an uppermost disc of the plurality of discs, the liquid passing through the plurality of holes through force of gravity to be reheated and to ascend again through the riser.

4. The liquid cleaning device of claim 3, wherein the diameter of the discs is approximately equal to the inner diameter of the cylindrical vessel and each of the discs are arranged in a plane, each plane being substantially parallel to the plane of the other discs; the distance between the discs being about 9 mm and the small holes in the discs have a diameter of about 2–4 mm.

5. The liquid cleaning device of claim 3, wherein each of the discs are arranged in a plane, each plane being substantially parallel to the plane of the other discs.

6. The liquid cleaning device of claim 3, wherein the lower portion of the cylindrical vessel comprises a dome of insulating material.

7. The liquid cleaning device of claim 6, wherein the dome includes a valve configured to allow water into the lower portion of the vessel and preventing steam from passing out of the lower portion through the valve.

8. The liquid cleaning device of claim 6, wherein the dome is arched in shape, such that, at a time when the liquid in the lower portion is heated, gas bubbles gather towards the tubular riser.

9. The liquid cleaning device of claim 3, wherein the heating device is substantially flat.

10. A liquid cleaning device comprising:

a cylindrical vessel for holding the liquid, the vessel having an upper portion and a lower portion, the lower portion arranged to contain a portion of the liquid;

means, located in the lower portion of the cylindrical vessel, for heating the portion of the liquid in the lower portion of the vessel;

a plurality of discs of substantially equal diameter arranged in the upper portion of the cylindrical vessel and having a diameter approximately equal to the inner diameter of the upper portion of the cylindrical vessel, the plurality of discs having a plurality of holes distributed uniformly across the surface of the discs, the holes having drip edges;

means, arranged centrally in the vessel and extending from the lower portion of the cylindrical vessel and through the plurality of discs, for transporting heated liquid from the lower portion to an upper, open end of the means for transporting liquid; and means, arranged at the upper open end of the means for transporting heated liquid, for distributing the heated liquid uniformly over an uppermost disc of the plurality of discs, the liquid passing through the plurality of holes through force of gravity to be reheated and to ascend again through the means for transporting liquid.

11. The liquid cleaning device of claim 10, wherein the lower portion of the cylindrical vessel comprises a dome of insulating material.

12. The liquid cleaning device of claim 11, wherein the dome includes means for allowing water into the lower portion of the vessel and preventing steam from passing out of the lower portion.

13. The liquid cleaning device of claim 11, wherein the dome is arched in shape, such that, at a time when the liquid in the lower portion is heated, gas bubbles gather towards the means for transporting heated liquid.

* * * * *